(12) United States Patent
Webb et al.

(10) Patent No.: US 10,400,918 B2
(45) Date of Patent: Sep. 3, 2019

(54) RACEWAY

(71) Applicant: AIRBUS OPERATIONS LIMITED, Bristol (GB)

(72) Inventors: Michael Webb, Bristol (GB); Daren Healy, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 15/373,919

(22) Filed: Dec. 9, 2016

(65) Prior Publication Data
US 2017/0167637 A1   Jun. 15, 2017

(30) Foreign Application Priority Data
Dec. 11, 2015 (GB) .................................. 1521881.1

(51) Int. Cl.
| | |
|---|---|
| *F16L 59/14* | (2006.01) |
| *F16L 3/26* | (2006.01) |
| *H02G 3/04* | (2006.01) |
| *F16L 3/223* | (2006.01) |
| *F16L 3/23* | (2006.01) |

(52) U.S. Cl.
CPC ............. *F16L 3/26* (2013.01); *F16L 3/223* (2013.01); *F16L 3/23* (2013.01); *F16L 59/14* (2013.01); *H02G 3/04* (2013.01); *H02G 3/0412* (2013.01); *H02G 3/0437* (2013.01); *B64D 2221/00* (2013.01)

(58) Field of Classification Search
USPC .............. 174/40 R, 41, 44; 248/61; 211/162
See application file for complete search history.

(56) References Cited

U.S. PATENT DOCUMENTS

| | | | | |
|---|---|---|---|---|
| 4,093,818 A * | 6/1978 | Thwaites | ............... | A62C 2/06 |
| | | | | 138/108 |
| 4,194,521 A | 3/1980 | Banta | | |
| 4,419,535 A * | 12/1983 | O'Hara | ............... | H02G 3/22 |
| | | | | 169/48 |
| 4,433,732 A * | 2/1984 | Licht | ............... | A62C 3/16 |
| | | | | 138/167 |
| 4,493,173 A | 1/1985 | Kohaut | | |
| RE32,131 E * | 4/1986 | Stahl | ............... | C09D 5/185 |
| | | | | 106/18.11 |
| 5,347,767 A | 9/1994 | Roth | | |
| 2010/0275539 A1 * | 11/2010 | Shaw | ............... | E04B 1/948 |
| | | | | 52/232 |

(Continued)

FOREIGN PATENT DOCUMENTS

| | | |
|---|---|---|
| DE | 102014105737 A1 | 10/2015 |
| EP | 0184931 A2 | 6/1986 |

(Continued)

OTHER PUBLICATIONS

Envirograf: "Product No. 26 Intumescent Pads Test Details: Integrity Insulation LPC-TE 92907 245 Minutes 142 Minutes Chiltern—RF 95001 181 Minutes 120 Minutes ENVIRGRAF", Dec. 26, 2012 (Dec. 26, 2012), XP055404981, 1 page.

(Continued)

*Primary Examiner* — Alfred J Wujciak
(74) *Attorney, Agent, or Firm* — Nixon & Vanderhye P.C.

(57) ABSTRACT

A raceway and method of forming a raceway is disclosed in which one or more intumescent layers are disposed on the raceway.

15 Claims, 6 Drawing Sheets

(56) References Cited

U.S. PATENT DOCUMENTS

| | | | | |
|---|---|---|---|---|
| 2010/0306896 A1* | 12/2010 | Schneider | .............. | A41D 1/215 |
| | | | | 2/52 |
| 2012/0205134 A1* | 8/2012 | Brasier | ................ | H02G 3/0406 |
| | | | | 174/68.3 |
| 2015/0204087 A1 | 7/2015 | Muenzenberger | | |

FOREIGN PATENT DOCUMENTS

| | | | | | |
|---|---|---|---|---|---|
| EP | | 2637271 | A1 | 9/2013 | |
| GB | | 2222916 | A | 3/1990 | |
| WO | | 9322814 | A1 | 11/1993 | |
| WO | WO 2006137637 | A1 * | 12/2006 | ........... | H02G 3/0418 |
| WO | | 2011027002 | A2 | 3/2011 | |

OTHER PUBLICATIONS

UKIPO Search Report dated Jun. 3, 2016 issued in Great Britain Application No. 1521881.1.
European Examination Report cited in European Application No. 16199532.9, dated Nov. 7, 2018, 6 pages.

* cited by examiner

RACEWAY

RELATED APPLICATIONS

The present application claims priority from Great Britain Application No. 1521881.1, filed Dec. 11, 2015, the disclosure of which is hereby incorporated by reference herein in its entirety.

FIELD OF TECHNOLOGY

The present technology relates to raceways. Such raceways may be used for supporting power or signal conductors such as pipes, cables or wires with resect to a structure.

BACKGROUND

Raceways are generally arranged to be fixed to a support structure and to provide one or more channels for holding power or data carriers such as pipes, cables or wires. The power or data carriers may be tied or otherwise bound together in bundles before being housed in the raceway and may also be fixed within the raceway. Thus the raceway supports the power and data carriers with respect to the support structure and may also provide some further physical protection or shielding of the supported power and data carriers.

BRIEF SUMMARY OF THE TECHNOLOGY

Embodiments of the present technology provide a raceway comprising: a plurality of wall portions adjoining a base portion together defining a plurality of longitudinal open channels, the open side of each channel being arranged to provide access for installation of one or more cables or pipes or wires within the respective channel; and an intumescent layer disposed on the inner surface of at least one of the wall portions adjacent the open side of the respective channel, the intumescent layer having a non-activated state in which the open side of the channel is maintained substantially open and a thermally activated state in which the or each intumescent layer expands so as to close the open side of the respective channel.

Minimal or selected provision of the intumescent layers enables weight and costs of the raceway to be reduced.

The or each intumescent layer may be arranged to expand so as to substantially close the open side of the respective channel. The or each intumescent layer may be arranged to expand so as to at least partially close the open side of the respective channel. The or each intumescent layer is confined to the distal part of the inner surface of the wall portion relative to the base portion. A third intumescent layer may be disposed on substantially all the exterior longitudinal surfaces of the raceway. Intumescent layers may be disposed on either side of a given wall portion, the intumescent layers are contiguous so as to extend over the distal edge of the wall portion. At least two of the channels may be of substantially different volumes. The raceway may further comprising: one or more cable clip connector elements formed in the base portion within at least one of the channels; and a second intumescent layer disposed on the exterior longitudinal surface of the base portion adjacent the cable clip connector elements. The raceway according may be formed from aluminium or an aluminium alloy. An aircraft structure may comprise the raceway.

Another embodiment provides a raceway comprising one or more channels for supporting power or signal conductors, the or each channel being at least partially coated with an intumescent material arranged to substantially close the or each channel in response to thermal activation of the intumescent material so as to thermally insulate the interior of the channel.

A further embodiment provides a method of forming a raceway comprising the steps of: forming a plurality of wall portions adjoining a base portion together defining a plurality of longitudinal open channels, the open side of each channel being arranged to provide access for installation of one or more cables or pipes or wires within the respective channel; and disposing an intumescent layer on the inner surface of at least one of the wall portions adjacent the open side of the respective channel, the intumescent layer having a non-activated state in which the open side of the channel is maintained substantially open and a thermally activated state in which the or each intumescent layer expands so as to close the open side of the channel.

The or each intumescent layer may be confined to the distal part of the inner surface of the wall portion relative to the base portion. A third intumescent layer may be disposed on substantially all the exterior longitudinal surfaces of the raceway. Intumescent layers may be disposed on either side of a given wall portion, the intumescent layers being contiguous so as to extend over the distal edge of the wall portion.

Another embodiment provides a raceway substantially as disclosed herein with reference to FIG. 2, FIG. 4a or FIG. 5a.

BRIEF DESCRIPTION OF THE DRAWINGS

Embodiments of the technology will now be described, by way of example only, with reference to the following drawings in which.

DETAILED DESCRIPTION OF EMBODIMENTS OF THE TECHNOLOGY

Figure 1:
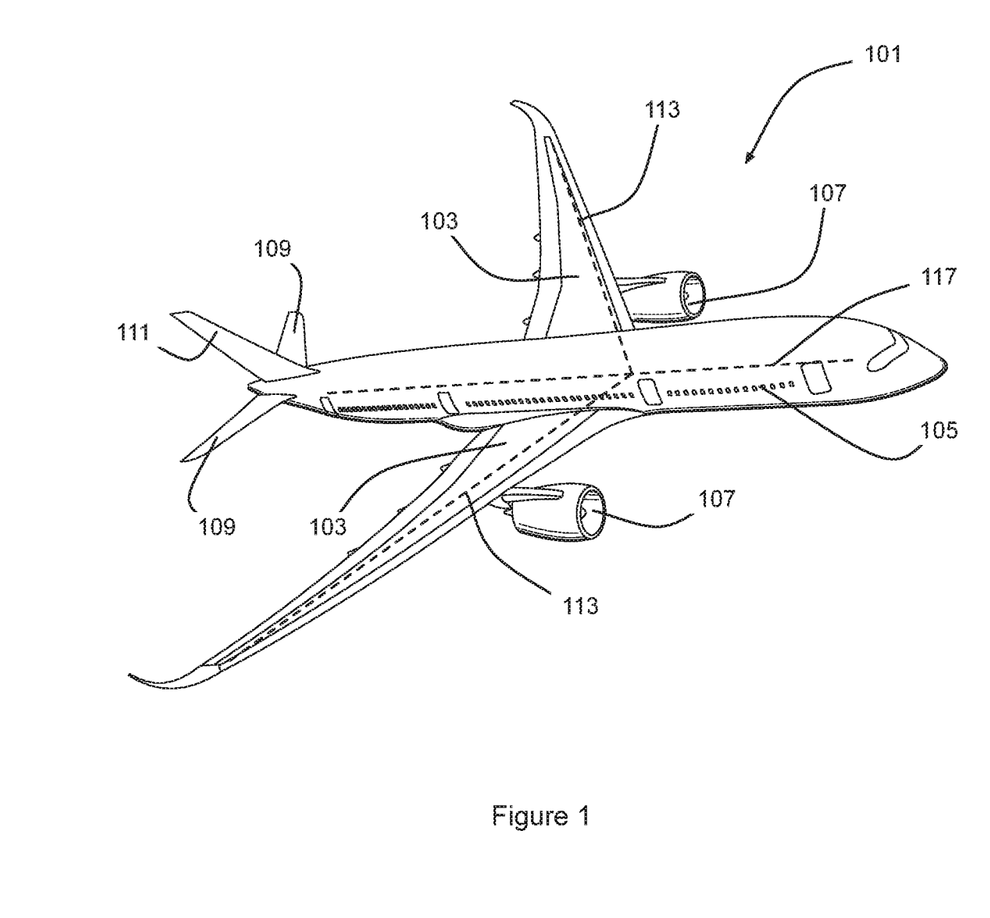
FIG. 1 is a perspective side view of an aircraft.

With reference to FIG. 1, an aircraft 101 comprises a pair of wings 103 faired into a fuselage 105. The wings 103 each carry an engine 107. The aircraft further comprises horizontal stabilizers 109 and a vertical tail plane 111 each attached at the rear of the fuselage 105. Aircraft systems (not shown) are distributed throughout the aircraft 101 and interconnected by suitable physical power or data carriers such as pipes, cables and wires arranged to enable the transmission of power, in the form of electrical or hydraulic power, or data, in the form of electrical or optical control or data signals between respective aircraft systems or sub-systems. Such pipes, cables and wires are mounted within raceways 113 fixed to the aircraft structure. The general location of the raceways 113 is indicated in FIG. 1 by the dotted line running fore and aft within the fuselage 105 fixed to the fuselage floor beams (not shown), and span-wise within each wing 103 fixed to the front spar (not shown). As will be understood by those skilled in the art, raceways 113 may be provided at any suitable location in the aircraft 101 to support cables, pipes or wires on an aircraft structural element.

Figure 2:
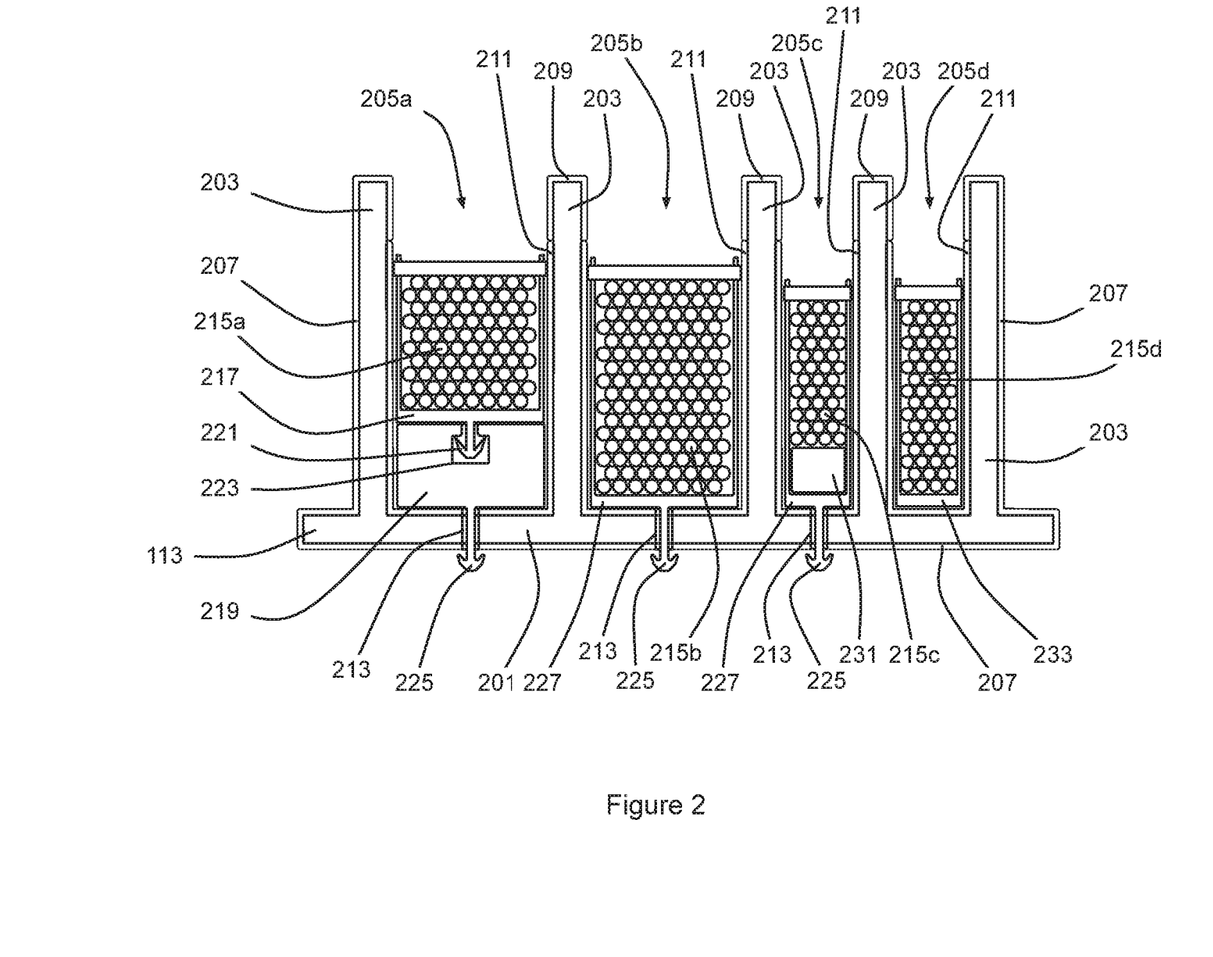
FIG. 2 is a cross-sectional view of a raceway in a non-activated state in the aircraft of FIG. 1.

With reference to FIG. 2, in one embodiment, the raceway 113 comprises a base portion 201 and five upstanding walls portions 203 which together with the base portion 201 define four longitudinal open channels 205a, 205b, 205c, 205d running along the length of the raceway 113 generally perpendicular to the cross section of FIG. 2. In the present embodiment, an intumescent layer 207, in the form of an intumescent paint, is disposed on the outer surfaces of the base portion 201 and wall portions 203 of the raceway 113. The intumescent layer 207 further extends over the end surfaces of the outermost wall portions 203 distal to the base portion 201 and laps onto the respective inward facing surfaces of the outermost wall portions 203. The intumescent layer 207 thus extends into the respective outer channels 205a, 205d so as to be disposed on the distal parts of the inner surface of each respective outermost wall portion 203.

In the present embodiment, further intumescent layers 209 are disposed on the respective distal ends of each of the three innermost wall portions 203. Each of the further intumescent layers 209 is disposed on the end surfaces of the innermost wall portions 203 and laps contiguously into the respective channel 205a, 205b, 205c, 205d onto the respective surfaces of each of the innermost wall portions 203. Each further intumescent layer 209 thus extends into the channels 205a, 205b, 205c, 205d so as to be disposed on the distal parts of the surface of each respective innermost wall portion 203 facing into the respective channel 205a, 205b, 205c, 205d. Thus the portions of the intumescent layers 207, 209 disposed within the respective channels 205a, 205b, 205c, 205d are confined to the distal part of the surface of the respective wall portion 203 relative to the base portion. In other words, the intumescent layers 207, 209 extend over substantially all of the external surfaces of the raceway 113 and partway into each of the channels 205.

Each of the channels 205a, 205b, 205c, 205d is provided with a further layer 211 covering the walls of the respective channel not otherwise covered by one of the intumescent layers 207, 209. In the present embodiment, the further layer is formed from nylon. Three of the channels 205a, 205b, 205c comprise cable clip connector elements 213 in the form of through-holes in the base portion 201, second intumescent layer 209 and further layer 211.

By way of example, four cable bundles 215a, 215b, 215c, 215d are fixed in their respective bundles using various cable clip arrangements. The first cable bundle 215a is fixed together with a first cable clip 217 which itself is fixed to an insulating member 219 by a harpoon member 221 on the cable clip 217 engaged in a socket 223 defined in a face of the insulating member 219. The insulating member 219 sits in the base of the channel 215a between the base member 201 and the first cable bundle 215a and further comprises a harpoon member 225 engaged in the cable clip connector element 213 so to fix the cable bundle 215a within the channel 205a.

The second cable bundle 215b is fixed together with a second cable clip 227 which comprises a harpoon member 229 engaged in the cable clip connector element 213 to fix the cable bundle 215b within the channel 205b. The third cable bundle 215c incorporates an insulating member 231 and is fixed together with a second cable clip 227. In other words, the insulating member 231 sits within the third cable bundle 215c, which is fixed within the channel 205c via the harpoon 229 engaged in the cable clip connector element 213. The fourth cable bundle 215d is fixed together with a third cable clip 233 and is fixed within the channel 205c by an interference fit between the bundle 215d and the sides of the channel 205d. Thus, where provided, each cable clip connector element 213 is arranged to provide an anchor point for the respective cable bundles 215a, 215b, 215c.

The intumescent layers 207, 209 are made from an intumescent material having a non-activated state and an activated state. The intumescent layers 207, 209 are applied to the raceway 113 in the non-activated state. In the present embodiment, the intumescent layers 207, 209 are applied to the raceway 113 by painting. The intumescent material is arranged so as to move to the activated state in response to exposure to heat exceeding a predetermined temperature and exposure time threshold. In other words, the intumescent material is thermally activated. In its activated state, the intumescent material expands to form an insulating layer of material that is substantially heat resistant for a predetermined exposure time period. Thus, the intumescent layers 207, 209 are arranged in their activated state to insulate the raceway 113 from heat. In particular, the activated intumescent layers 207, 209 are arranged to insulate the cables in the cable bundles 215 from the effects of heat so that the cables maintain their operational integrity for a predetermined period.

Figure 3:
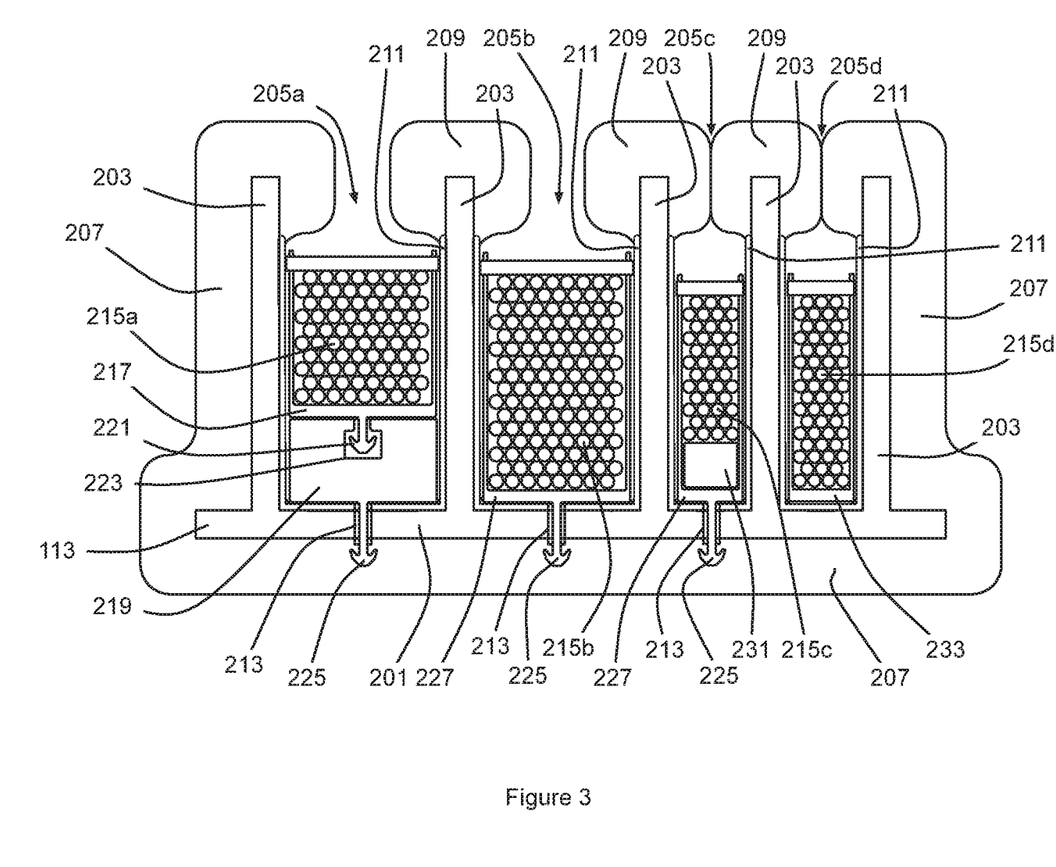
FIG. 3 is a further cross-sectional view of the raceway of FIG. 2 in an activated state.

FIG. 3 illustrates the intumescent layers 207, 209 in their activated state in which the raceway 113 is substantially enveloped in the insulative layer provided by the activated intumescent layers 207, 209. The intumescent layers 207, 209 in their activated state extend over substantially all of the external surfaces of the raceway 113 and partway into each of the channels 205. For the two rightmost channels 205c, 205d this results in the interior of these channels 205c, 205d containing the cable bundles 215c, 215d being substantially sealed from the exterior of the raceway 113 and the heat source by the expansion of the intumescent material across the longitudinal open side of the respective channel 205c, 205d. For the two leftmost channels 205a, 205b this results in the interior of these channels 205a, 205b containing the cable bundles 215a, 215b being partially sealed from the exterior of the raceway 113 and the heat source by the expansion of the intumescent material part way across the longitudinal open side of the respective channel 205c, 205d. The partial sealing of the channels 205a, 205b is arranged to provide less insulation for the interior of the 205a, 205b than if the channels 205a, 205b were fully sealed but still to provide a required predetermined level of thermal insulation.

As shown in FIG. 3, the intumescent layer 207 also extends over the each cable clip connector element 213. As a result, in its activated state, the intumescent layer 207 insulates the respective harpoons 225 of the cable ties 217, 227 from the effects of heat. This insulative effect of the activates intumescent layer 207 is arranged to maintain the integrity of the cable clip 217, 227 so that the cable tie remains fixed within the raceway 113 in accordance with a predetermined temperature range and exposure time period.

Further embodiments of the technology are described below with reference to respective figures in which, for clarity, the same nomenclature is used between figures for elements are common between embodiments.

Figure 4A:
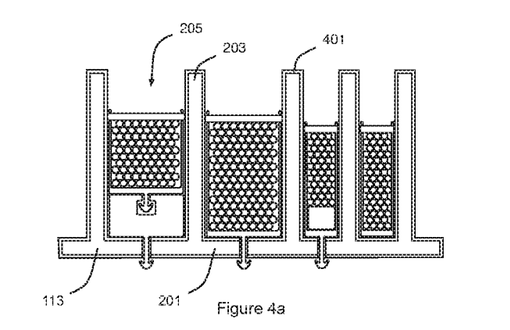
FIGS. 4a & 4b are cross-sectional views of a raceway in respective non-activated and activated states in accordance with another embodiment of the technology.

With reference to FIG. 4a, in another embodiment, a substantially contiguous intumescent layer 401 is disposed over all the longitudinal surfaces of the base and wall members 201, 203 of the raceway 113. In other words, the intumescent layer extends fully within each of the channels 205. Optionally the further layer 211 is omitted, as shown in FIG. 4a.

Figure 4B:
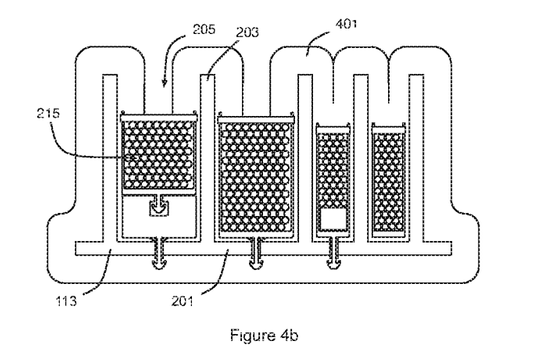

FIG. 4b, illustrates the intumescent layer 401 in its activated state in which the raceway 113 is substantially enveloped in the insulative layer provided by the activated intumescent layer 401. Since the intumescent layer 401 extends over substantially all of the interior surfaces of each of the channels 205, the cable bundles 215 are both substantially sealed from the exterior of the raceway 113 and insulated from the interior surfaces of the base and wall portions 201, 203 of the raceway. 113. Thus the cable bundles are provided with two layers of insulation from the relevant heat source.

Figure 5A:
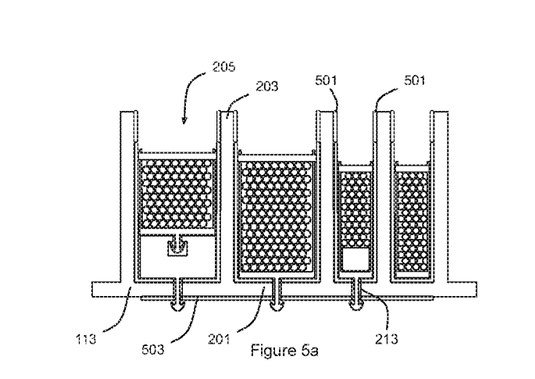
FIGS. 5a & 5b are cross-sectional views of a raceway in respective non-activated and activated states in accordance with a further embodiment of the technology.

With reference to FIG. 5a, in a further embodiment, the raceway 113 is provided with a set of discrete intumescent layers 501, 503. The first set of eight intumescent layers 501 are disposed on a respective distal portion of the surface of each wall portion 203 that faces into the respective channel 205. The second set of one intumescent layer 503 is disposed on at least part of the outer surfaces of the base portion 201 of the raceway 113 so as to extend over the or each cable clip connector element 213.

Figure 5B:
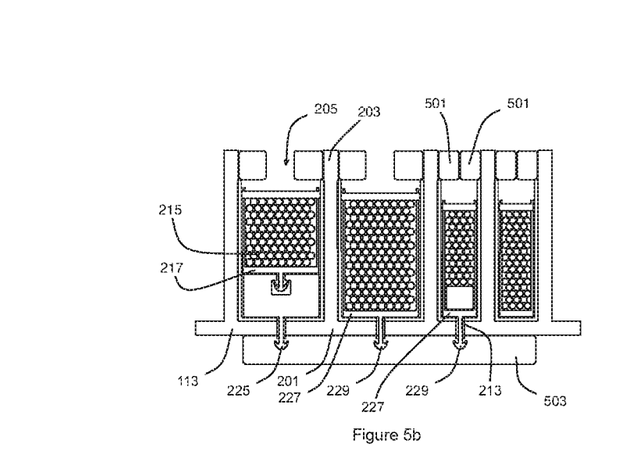

FIG. 5b illustrates the intumescent layers 501, 503 in their activated states in which the first set of eight intumescent layers 501 have together either partially or substantially closed the respective channels 205 as described above. The second intumescent layer 502 extends over the each cable clip connector element 213 and thus in its activated state insulates the respective harpoons 225, 229 of the cable ties 217, 227 from the effects of heat as described above.

Figure 6A:
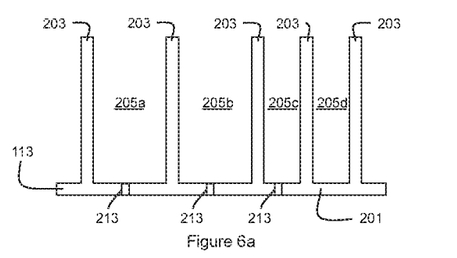
FIGS. 6a, 6b & 6c are successive cross-sectional views illustrating manufacturing steps for the raceway of FIG. 2.

In accordance with another embodiment, a method for manufacturing a raceway 113 in accordance with the embodiment as described above with respect to FIGS. 2 and 3 will now be described with reference to FIGS. 6a, 6b and 6c. With reference to FIG. 6a, in a first step, the raceway 113 is integrally formed to comprise the base portion 201 and the five upstanding walls portions 203 which together with the base portion 201 define the four longitudinal open channels 205a, 205b, 205c, 205d running along the length of the raceway 113 generally perpendicular to the cross section of FIG. 6a. In the present embodiment, the raceway is integrally formed from aluminum by extrusion. The series of one or more through-holes are formed in the base portion 201 of three of the channels 205a, 205b, 205c to provide the cable clip connector elements 213.

Figure 6B:
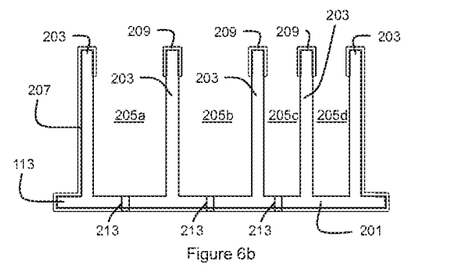

With reference to FIG. 6b, in a second step, the intumescent layer 207 is applied to the outer surfaces of the base portion 201 and wall portions 203, the end surfaces of the outermost wall portions 203 distal to the base portion 201, and the respective inward facing surfaces of the outermost wall portions 203. The further intumescent layers 209 are applied to the respective distal ends of each of the three innermost wall portions 203, the end surfaces of the innermost wall portions 203, and the respective surfaces of each of the innermost wall portions 203.

Figure 6C:
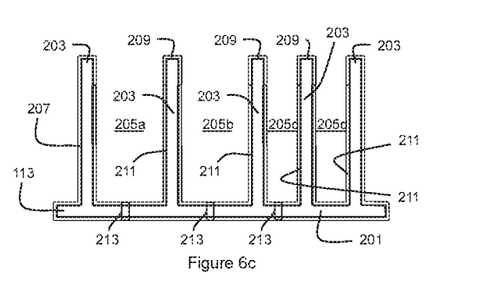

With reference to FIG. 6c, in a third step, the further layers 211 are placed in each channel 205 covering the walls of the respective channel not otherwise covered by one of the intumescent layers 207, 209. Holes are formed in the further layers 211 corresponding to each cable clip connector element 213 where present in a given channel 205.

In another embodiment of the technology, the end faces of the raceway are provided with an intumescent layer which may be contiguous with one or more of the other intumescent layers disposed on the raceway. The function of the intumescent layer on the end face of the raceway is to partially or substantially close the end of each respective channel in conjunction with the closing of the longitudinal open side the respective channel as described above. In a further embodiment, one or more of the end faces of the raceway are generally free of intumescent material.

As will be understood by those skilled in the art, in some applications of the technology it may be necessary or desirable to have one or more gaps or spaces in one or more of the intumescent layers while still enabling the required insulative effect in the activated state. Smaller gaps in an intumescent layer in its non-activated state may be closed up in transition to the activated state of the intumescent layer.

As will be understood by those skilled in the art, whether or not a channel of a given width is partially or substantially closed by the expansion of the relevant intumescent layer is dependent on the coefficient of expansion of the intumescent material or the thickness of the layer.

As will be understood by those skilled in the art the raceway may be integrally formed or constructed from a plurality of parts by any suitable forming means such as extrusion, milling, molding or any suitable constructing means such as welding, bonding or co-molding respectively. The raceway may be manufactured in strips including the intumescent layers and then cut or formed into shape for a given application. Alternatively, the raceway may be manufactured in strips, cut or formed into shape for a given application prior to the or each intumescent layers being applied. The or each intumescent layer may be disposed on the raceway by any suitable method such as painting, dipping, spraying, depositing or bonding.

The embodiments described herein are respective non-limiting examples of how the present technology, and aspects of the present technology, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The invention claimed is:

1. An aircraft raceway for securing cables, pipes, or wires in an aircraft, comprising:
   a plurality of wall portions adjoining a base portion together defining a plurality of longitudinal U-shaped open channels, the open side of each channel being arranged to provide access for installation of one or more aircraft cables or pipes or wires within the respective channel; and
   at least one intumescent layer, wherein each of the at least one intumescent layer is contiguously disposed continuously along on a corresponding inner surface and outer surface, and distal edges of at least one of the wall portions adjacent the open side of the respective channel, the at least one intumescent layer is continuously disposed continuously along on a corresponding inner surface and outer surface of the base portion,
   the at least one intumescent layer having a non-activated state in which the open side of the channel is maintained substantially open and a thermally activated state in which the at least one intumescent layer expands so as to close the open side of the respective channel.

2. A raceway according to claim 1 in which the at least one intumescent layer is arranged to expand so as to substantially close the open side of the respective channel.

3. A raceway according to claim 1 in which the at least one intumescent layer is arranged to expand so as to at least partially close the open side of the respective channel.

4. A raceway according to claim 1 in which the at least one intumescent layer is confined to the distal part of the inner surface of the wall portion relative to the base portion.

5. A raceway according to claim 1 in which a third intumescent layer is disposed on substantially all the exterior longitudinal surfaces of the raceway.

6. A raceway according to claim 1 in which at least two of the channels are of substantially different volumes.

7. A raceway according to claim 1 further comprising:
one or more cable clip connector elements formed in the base portion within at least one of the channels; and
a second intumescent layer disposed on the exterior longitudinal surface of the base portion adjacent the cable clip connector elements.

8. A raceway according to claim 1 formed from aluminum or an aluminum alloy.

9. An aircraft structure comprising the raceway according to claim 1.

10. A raceway according to claim 1 in which the at least one intumescent layer exposes a portion of the corresponding inner surface adjacent to the base portion.

11. A method of forming an aircraft raceway for securing cables, pipe, or wires in an aircraft, comprising the steps of:
forming a plurality of wall portions adjoining a base portion together defining a plurality of U-shaped longitudinal open channels, the open side of each channel being arranged to provide access for installation of one or more aircraft cables or pipes or wires within the respective channel; and
disposing at least one intumescent layer continuously and contiguously along on the inner surface, outer surface, and distal edges of at least one of the wall portions adjacent the open side of the respective channel, the at least one intumescent layer is continuously disposed continuously along on a corresponding inner surface and outer surface of the base portion,
the at least one intumescent layer having a non-activated state in which the open side of the channel is maintained substantially open and a thermally activated state in which the at least one intumescent layer expands so as to close the open side of the channel.

12. A method according to claim 11 in which the at least one intumescent layer is confined to the distal part of the inner surface of the wall portion relative to the base portion.

13. A method according to claim 12 in which a third intumescent layer is disposed on substantially all the exterior longitudinal surfaces of the raceway.

14. A method according to claim 12 in which where intumescent layers are disposed on either side of a given wall portion of the plurality of wall portions, the intumescent layers are contiguous so as to extend over the distal edge of the given wall portion.

15. A method according to claim 11 in which the disposing of the at least one intumescent layer comprises exposing a portion of an inner surface adjacent to the base portion.

* * * * *